May 7, 1968     W. G. BUCHANAN     3,381,578

MACHINE TOOL DRIVE MECHANISM

Filed March 30, 1966     2 Sheets-Sheet 1

INVENTOR.
WILLIAM G. BUCHANAN
BY *Richard W. Treverton*
ATTORNEY

May 7, 1968   W. G. BUCHANAN   3,381,578
MACHINE TOOL DRIVE MECHANISM
Filed March 30, 1966   2 Sheets-Sheet 2 though he drive pin enters a slot 39 and advances
United States Patent Office 3,381,578
Patented May 7, 1968

3,381,578
MACHINE TOOL DRIVE MECHANISM
William G. Buchanan, Rochester, N.Y., assignor to The Gleason Works, Rochester, N.Y., a corporation of New York
Filed Mar. 30, 1966, Ser. No. 538,783
5 Claims. (Cl. 90—9)

The present invention relates to a drive mechanism for gear cutting machines and other machine tools, and particularly to such a mechanism comprising indexing means of the Geneva type.

The primary object of the invention is to simplify and compact the mechanism, thereby reducing the size and weight of the work spindle housing of the gear cutting machine or other machine component in which the indexing device is mounted.

A mechanism according to the invention comprises a housing rotatably supporting a driven wheel which has radial slots and a rotary driver which has a drive pin engageable successively in the slots of the wheel to intermittently rotate the wheel, a cam for shifting the driver axially in the housing to render the pin engageable and unengageable with the slots, and reduction gearing connecting the driver with the cam so that the pin is engageable with the slots to effect the intermittent rotation of the wheel only once per a plurality of revolutions of the driver, the cam being mounted on the driver for relative rotation thereon and for axial motion in unison therewith, and a cam follower supported by the housing in engagement with the cam.

Preferably the driven wheel is secured to the work spindle of the machine for rotation in unison therewith, the rotary cutter of the machine has therearound a plurality of cutting blades of which the last and first are separated by an indexing gap, the cutter and driver are connected by gearing whose ratio is so related to that of the aforesaid reduction gearing that the rotations of the cutter and cam are in one to one ratio, and the path of the cam is so related to the gap that the intermittent rotation will occur while the gap is abreast of a workpiece on the spindle.

Figure 1:
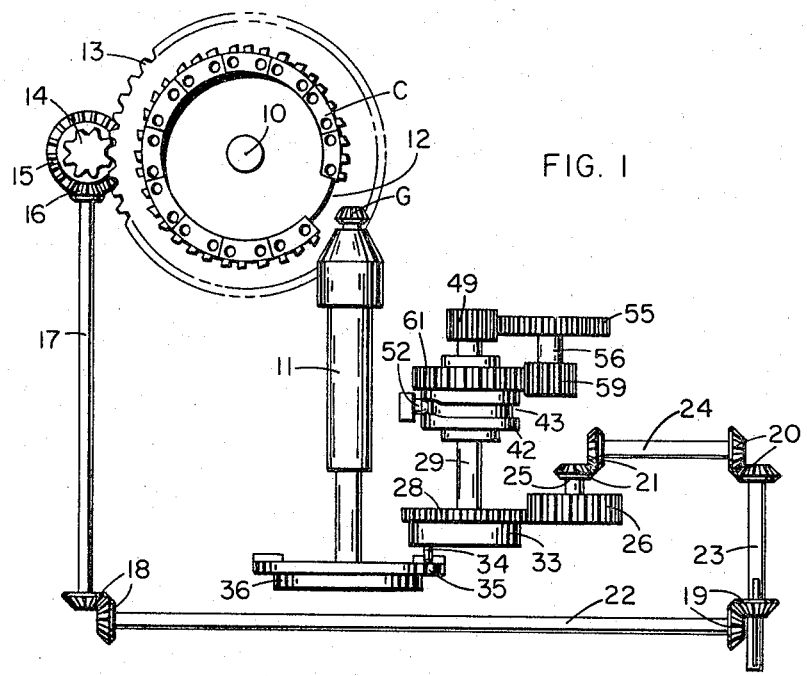
Figure 2:
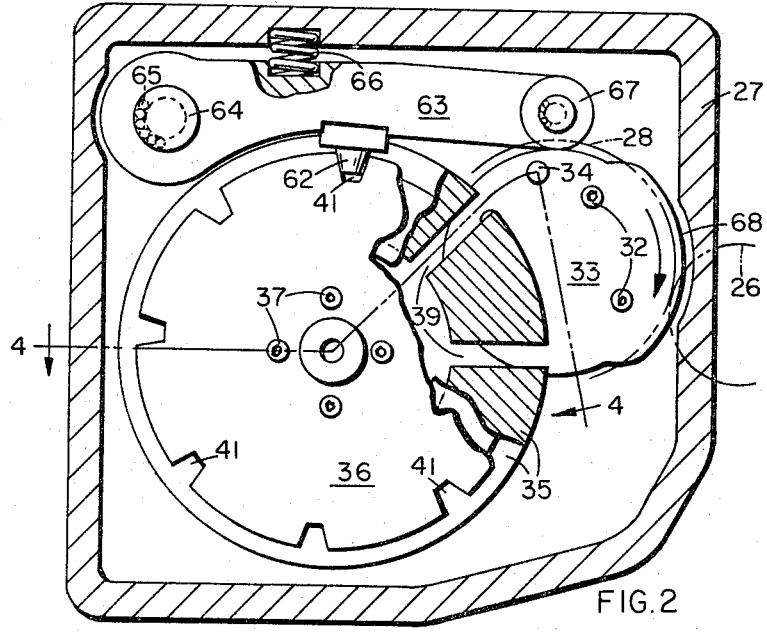
Figures 3, 4:
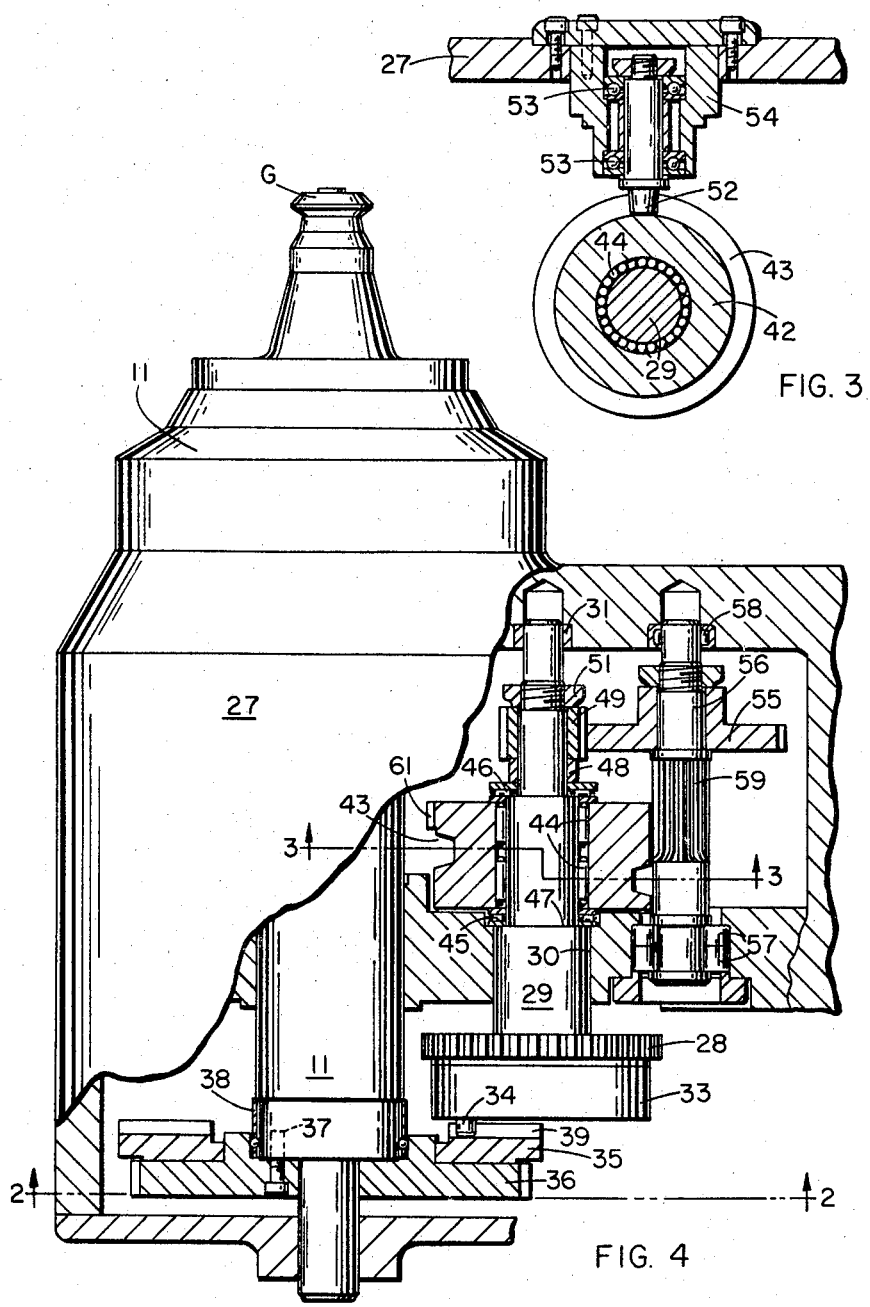

A preferred embodiment of the invention is shown in the accompanying drawings, wherein:

FIG. 1 is a drive diagram of the machine;

FIGS. 2 and 3 are detail sectional views respectively in planes 2—2 and 3—3 of FIG. 4; and FIG. 4 is an elevation of the work spindle and work spindle housing of the machine, with parts in section in planes 4—4 of FIG. 2.

The machine may be of the general type disclosed in Patent No. 2,288,058 to E. Wildhaber et al. and No. 3,229,585 to T. A. Deprez et al. As shown in FIG. 1 the machine may comprise a spindle 10 supporting a cutter C which is adapted to make one revolution in cutting each tooth slot of a work gear G that is chucked on a work spindle 11. The cutter has a gap 12 between the last and first of its cutting blades, and each time this gap comes abreast of the work gear the work spindle is indexed angularly to position the gear for cutting of the next tooth slot. At other times the work spindle is held against rotation. Cutter rotation is continuous, at least throughout the cutting of any one work gear. The cutter spindle drive motor is not shown.

The drive for the work spindle includes a gear 13 on spindle 10 co-rotatable with the cutter, a pinion 14 driven by the gear, a bevel gear 15 co-rotatable with pinion 14 and meshing with a bevel gear 16 on shaft 17. The drive from shaft 17 is through bevel gears 18, 19, 20, 21 and shafting 22, 23, 24 to a shaft 25 and index drive pinion 26 which are mounted for rotation in the work spindle housing 27 shown in FIGS. 2 to 4. Pinion 26 meshes with a gear 28 affixed to a shaft 29 which is rotatable and also axially movable in the housing on plain bearing 30 and bushing 31. Detachably secured to shaft 29, by screws 32, FIG. 2, is a pawl-lifting cam 33 and, rigid therewith, the drive pin 34 of a Geneva motion whose radially slotted driven wheel is designated 35. This wheel, together with a notched index plate 36 is detachably secured to work spindle 11 by screws 37, after being centered relative to the spindle on a ball sleeve 38. The number of slots 39 in the wheel and of notches 41 in the plate corresponds to the number of tooth slots to be cut in the work gear G.

A barrel cam 42 having therearound a continuous cam groove 43 is rotatable on shaft 29 on needle bearings 44, and is held for axial motion in unison with the shaft by axial thrust roller bearings 45 and 46. Bearing 45 is backed by shoulder 47 of the shaft and bearing 46 by a spacer 48, a pinion 49 and nut 51. As best shown in FIG. 3 a follower roller 52 is engaged in cam groove 43, the roller being journaled in roller bearings 53 in a support 54 secured to the housing 27. The cam slot is so proportioned that the cam during each revolution thereof, and with it the shaft 29, is moved axially back and forth between an advanced position (lowered in FIGS. 1 and 4) wherein the drive pin 34 is engageable in slots 39, and a retracted position in which the pin is clear of the wheel 35. Upon each turn of the shaft 29 while advanced, the pin 34 enters a slot 39 and advances the wheel 35 and spindle 11 by one tooth pitch of the work gear.

The pinion 49 affixed on shaft 29 meshes with gear 55 secured upon a shaft 56 that is journaled for rotation in the housing on bearings 57 and 58. Pinion teeth 59 provided on shaft 56 mesh with gear teeth 61 on the cam. The ratio of reduction gearing 49, 55, 59, 61, in the particular embodiment illustrated, is twelve to one, the cam 42 being driven through one turn for each twelve turns of shaft 29. The gearing 13–16, 18–21, 26 and 28 is of inverse ratio, i.e. one to twelve, so that the cam 42 makes one turn for each turn of cutter C, while the shaft 29 makes twelve turns. During only one turn of each series of twelve turns the cam advances the shaft axially and holds it advanced through an angle of cam rotation sufficient to cause the advanced drive pin 34 to center a slot 39 and index the driven wheel 35 by one pitch. The cam then promptly retracts the shaft. The cam slot 43, drive pin 34 and cutter gap 12 are so coordinated that this indexing action occurs only while the gap is abreast of the work gear, the condition shown in FIG. 1.

At all times while the drive pin 34 is not engaged with a slot 39, the spindle 11 is held against rotation by the engagement of a locking pawl 62, FIG. 2, in a notch 41 of plate 36. The pawl is on a lever 63 which is fulcrumed to stud 64 on the housing 27 on anti-friction bearing 65. A spring 66 acts against the lever to seat the pawl, and a roller 67 mounted on an anti-friction bearing on the lever is engaged by a lobe 68 of cam 33 to disengage the pawl as indexing begins and to allow it to re-engage under pressure of spring 66 as the indexing ends. When the shaft 29 is retracted, to render pin 34 unengageable with slots 39, the cam 33 is also displaced axially from roller 67. Accordingly the cam lobe 68 engages the roller 67 only during those revolutions of the shaft during which the pin is to index the wheel and spindle assembly, 11, 35, 36.

The arrangement disclosed, wherein the cam 42 is rotatable on shaft 29, and moves axially in unison with the shaft, enables a relatively compact and sturdy construction of the housing and the movable parts therein, and also enables the movable parts to be of relatively low mass which is highly desirable in view of the rapidity of indexing required by the continuous rotation of the cutter at high cutting speed, and in view of the advantage of limiting the length of the gap 12 so as to enable optimum utilization of the cutter periphery for cutting blades.

Having now described my invention, and the operation and advantages thereof, what I claim is:

1. An indexing mechanism of the Geneva type for a gear machine or other machine tool comprising a housing rotatably supporting a driven wheel which has radial slots and a rotary driver which has a drive pin engageable successively in the slots of the wheel to intermittently rotate the wheel, a cam for shifting the driver axially in the housing to render the pin engageable and unengageable with the slots, and reduction gearing connecting the driver with the cam so that the pin is engageable with the slots to effect the intermittent rotation of the wheel only once per a plurality of revolutions of the driver, the cam being mounted on the driver for relative rotation thereon and for axial motion in unison therewith, and a cam follower supported by the housing in engagement with the cam.

2. A mechanism according to claim 1 in which the cam is of barrel form having a continuous cam slot extending around its peripheral face, and the follower comprises a roller confined in said cam slot.

3. A mechanism according to claim 1 in a machine tool having a rotary cutter and a work spindle, said driven wheel being secured to said spindle for rotation in unison therewith, said cutter having therearound a plurality of cutting blades of which the last and first are separated by an indexing gap, gearing connecting the cutter and driver for causing the rotations of the cutter and the cam to be in one-to-one ratio, and the path defined by said cam slot being so related to the cutter as to cause the intermittent rotation to occur while the gap is abreast of a workpiece on the spindle.

4. A machine tool mechanism comprising a work spindle and rotary cutter with a plurality of cutting blades of which the last and first are separated by an indexing gap, a housing journaling the work spindle for rotation, the spindle having secured thereto a Geneva index wheel having radial slots, an index driver rotatable and axially movable in the housing about an axis parallel to the work spindle, said driver having a drive pin adapted to successively engage in the slots of the wheel to intermittently rotate the wheel and the work spindle, a cam for shifting the driver axially in the housing to render the pin engageable and unengageable with the slots, the cam being mounted on the driver for relative rotation thereon and for axial motion in unison therewith, a cam follower supported by the housing in engagement with the cam, gearing so connecting the cutter and the driver that the latter makes a plurality of complete revolutions per revolution of the cutter, and reduction gearing connecting the driver with the cam so that the pin is engageable with the slots to effect said intermittent rotation only once per revolution of the cutter, the cam being so coordinated with the cutter as to cause the intermittent rotation to occur while the gap is abreast of a workpiece on the spindle.

5. A mechanism according to claim 1 in which the driven wheel includes a notched index plate, a pawl for engagement with the notches of the plate movably supported by the housing, and the driver includes a cam for disengaging the pawl, said cam being moved axially into and out of engageable relation to the pawl coincidentally with the pin being moved axially into and out of engageable relation to said slots.

References Cited

UNITED STATES PATENTS 2,448,426  8/1948  Galloway _____ 90—9

FRANCIS S. HUSAR, *Primary Examiner.*